US005762894A

United States Patent [19]

Takatori et al.

[11] Patent Number: 5,762,894
[45] Date of Patent: Jun. 9, 1998

[54] PROCESS FOR PRODUCING COMPOSITE OXIDE POWDER CONTAINING CERIUM AND ZIRCONIUM

[75] Inventors: Kazumasa Takatori, Nagoya; Naoyoshi Watanabe, Aichi-ken; Hideo Sobukawa, Nisshin; Haruo Doi, Nagoya, all of Japan

[73] Assignee: Kabushiki Kaisha Toyota Chuo Kenkyusho, Aichi-ken, Japan

[21] Appl. No.: 498,701

[22] Filed: Jul. 3, 1995

[30] Foreign Application Priority Data

Jul. 1, 1994 [JP] Japan .................. 6-151264
Apr. 21, 1995 [JP] Japan .................. 7-097077

[51] Int. Cl.$^6$ .............................. C01F 17/00; B01J 23/00
[52] U.S. Cl. ............................ 423/263; 502/302; 502/303; 502/304
[58] Field of Search ...................... 502/304, 302, 502/303; 423/263

[56] References Cited

U.S. PATENT DOCUMENTS

| 2,900,244 | 8/1959 | Bradstreet et al. .................. 423/263 |
| 4,621,071 | 11/1986 | Blanchard et al. .................. 423/213.5 |
| 4,910,180 | 3/1990 | Berndt et al. .................. 423/213.5 |
| 4,927,799 | 5/1990 | Matsumoto et al. .................. 502/303 |
| 5,130,109 | 7/1992 | Wan .................. 423/213.5 |

FOREIGN PATENT DOCUMENTS

| 611192 | 8/1994 | European Pat. Off. .............. 423/263 |
| 4307333 | 9/1994 | Germany .................. 423/263 |
| 47-11550 | 4/1972 | Japan . |
| 62-53701 | 3/1987 | Japan . |
| 1-192708 | 8/1989 | Japan . |
| 2-59405 | 2/1990 | Japan . |

*Primary Examiner*—Steven Bos
*Attorney, Agent, or Firm*—Oblon, Spivak, McClelland, Maier & Neustadt, P.C.

[57] ABSTRACT

A process for producing a powder of composite oxide which includes cerium and zirconium, or which includes cerium, zirconium and further a rare-earth element other cerium. The process includes: dissolving nitrate, sulfate and/or acetate of constituent elements of the composite oxide into water in a predetermined ratio; and spraying and heating a resulting aqueous solution to oxidize the constituent elements of the composite oxide for converting them into a powder of a composite oxide. The thus produced composite oxide powder is micro-fine, homogeneous, and heat resistant.

13 Claims, No Drawings

PROCESS FOR PRODUCING COMPOSITE OXIDE POWDER CONTAINING CERIUM AND ZIRCONIUM

BACKGROUND OF THE INVENTION

1. Field of the Invention

The present invention relates to a process for producing a powder of composite oxide which includes cerium and zirconium, or which includes cerium, zirconium and further a rare-earth element other than cerium. The composite oxide can be used as one of the ingredients of exhaust-gas-purifying catalysts for automobiles, and can be expressed by a chemical formula, $Ce_{1-x}Zr_xO_{2-z}$ or $Ce_{1-x-y}Zr_xR_yO_{2-z}$ in which "R" specifies a rare-earth element other than cerium.

2. Description of the Related Art

When producing a powder of composite oxide, a synthesis process is employed industrially in which compound powders, including oxides or metallic carbonates to be converted into metallic oxides, are simply mixed, and the mixed powder is subjected to a solid phase reaction at an elevated temperature. However, in the solid phase reaction, it is difficult to homogenize the components. For instance, when the mixed powder is held at a high temperature so as to activate the diffusion of the components, the components undergo granular growth so remarkably that no fine-particulated and homogenized powder can be produced.

Under the circumstances, chemical processes, such as an alkoxide process and a co-precipitation process, have been investigated at laboratory level in order to prepare a powder of composite oxide which is pure, homogeneous and micro-fine. In the alkoxide process, metallic compounds having alkoxyl groups are employed as starting materials. This process can produce homogeneous compositions. However, it has to use highly expensive raw materials, and, except certain special applications, it cannot be established industrially. In the co-precipitation process, aqueous solutions containing metallic ions are mixed in liquid state, and pH of the mixed aqueous solution is controlled so as to produce solids. However, it is difficult to simultaneously and homogeneously precipitate a plurality of metallic ions in the form of solids. Accordingly, by devising a variety of techniques at laboratory level, the process is now under research and development in order to prepare a homogeneous powder. At present, the process can only produce powders of non-homogeneous composition when it is applied to mass-production.

When producing a powder of homogeneous composition industrially, it is advantageous to mix starting materials in aqueous state. For example, Japanese Examined Patent Publication (KOKOKU) No. 47-11,550 discloses a spray-drying process in which a mixed aqueous solution is sprayed in an atmosphere of elevated temperature so as to cause dehydration and oxidation reactions, thereby preparing a powder. The raw materials used in the spray-drying process can be water-soluble compounds, such as metallic chlorides and metallic nitrates, or alkoxides capable of forming mixed organic solutions. There is no limitation on the raw materials as far as they can dissolve into common solvents.

As for the water-soluble compounds employed as the raw materials for the spray-drying process, chlorides are available. In particular, it is said to be industrially advantageous to employ chlorides which are recycled from hydrogen chloride. The hydrogen chloride is usually produced as by-products during production, and it is present in the waste gas. For instance, Japanese Unexamined Patent Publication (KOKAI) No. 1-192,708 discloses such a process. In this process, aqueous solutions with metallic chloride raw materials dissolved thereinto are sprayed and mixed in an elevated temperature gas flow which is virtually free from reducing materials, and they are rapidly heated and held at a predetermined high temperature in the elevated temperature gas flow. The raw materials and decomposed products are heated by the elevated temperature gas flow, and flow parallelly together with the gas flow in order to decompose the mixture of the metallic chlorides, thereby preparing micro-fine particles. Moreover, Japanese Unexamined Patent Publication (KOKAI) No. 2-59,405 discloses a spray-drying apparatus. According to this publication, a mixed aqueous solution involving metallic chloride raw materials is heated to three stages, e.g., low temperature, intermediate temperature and high temperature, and then it is fed into the apparatus. As a result, the apparatus can prevent the composition from deviating and inhibit impurity phases from arising.

Composite oxide, which is expressed by a chemical formula, $Ce_{1-x-y}Zr_xR_yO_{2-z}$ ("R" specifies a rare-earth element other than cerium.), has been known that it can be used as one of the ingredients of catalysts for purifying automobile exhaust gases. When heat resistance cannot be given to the catalysts satisfactorily by involving $CeO_2$ alone therein, the composite oxide is employed especially; namely, U.S. Pat. No. 4,927,799 discloses to improve the catalysts in terms of heat resistance by dissolving Zr and "R" into $CeO_2$.

The aforementioned composite oxide exhibits a higher exhaust-gas-purifying catalytic capability when it includes Ce in a larger amount. If such is the case, however, the composite oxide exhibits low heat resistance. In order to upgrade the combustion efficiency of engines and combustors, engineers tend to increase combustion temperature. As a result, the temperature of exhaust gases increases accordingly. Consequently, exhaust-gas-purifying catalysts are required to have such high heat resistance that they can keep their catalytic capability under the elevated temperature conditions. Hence, when preparing the composite oxide which has a composition expressed by a chemical formula, $Ce_{1-x-y}Zr_xR_yO_{2-z}$, as one of the ingredients of the exhaust-gas-purifying catalysts, it is necessary to decrease the cerium content, and at the same time to make it into a homogeneous micro-fine powder.

In the production of the composite oxide which has a composition expressed by a chemical formula, $Ce_{1-x-y}Zr_xR_yO_{2-z}$, the raw materials, i.e., a basic oxide powder (e.g., ceria) and other metallic oxides, are mixed in particulate state or in solution state into which they are dissolved, and they are heated in solid state to prepare the composite oxide.

Concerning the conventional processes, no process has been known so far which utilizes a spray-drying method to produce the composite oxide which has a composition expressed by a chemical formula, $Ce_{1-x-y}Zr_xR_yO_{2-z}$ or $Ce_{1-x}Zr_xO_{2-z}$.

In the production of the composite oxide having a composition expressed by a chemical formula, $Ce_{1-x-y}Zr_xR_yO_{2-z}$ or $Ce_{1-x}Zr_xO_{2-z}$, in which a spray-drying is employed and chlorides of the constituent elements are used as raw materials, the present inventors verified that, when Zr substitutes Ce in an amount of from 20 to 80% in the composite oxide, no powder of homogeneous solid-solution can be prepared. The resulting powder has a mixed phase consisting of two solid-solution phases, in which Zr substitutes Ce in an amount of less than 20% in one phase and more than 80% in another phase. In the micro-fine particulates which involve two solid-solution phases, heat resistance and catalytic activity cannot coexist at the same time. It is still under investigation why a powder of homogeneous solid-solution cannot be produced.

SUMMARY OF THE INVENTION

The present invention has been developed in view of the aforementioned circumstances. Accordingly, it is an object of the present invention to provide a process for producing a powder of composite oxide at less expensive costs. The composite oxide produced thereby has a composition which is expressed by a chemical formula, $Ce_{1-x}Zr_xO_{2-z}$ or $Ce_{1-x-y}Zr_xR_yO_{2-z}$: wherein "R" specifies a rare-earth element other than Ce, it is of fine particulate and homogeneity, and it is applicable to an exhaust-gas-purifying catalyst. It is a further object of the present invention to provide a process for producing the composite oxide which has both heat resistance and a catalytic property.

In an aspect of the present invention, the present process for producing a powder of composite oxide including cerium and zirconium comprises the steps of:

dissolving acid salts of cerium and zirconium into water for preparing an aqueous solution of the acid salts, the acid salts being selected from the group of nitrate, sulfate and acetate; and spraying and heating the aqueous solution for oxidizing the acid salts so as to convert them into a powder of a composite oxide including cerium and zirconium.

In another aspect of the present invention, the process for producing a powder of composite oxide including cerium, zirconium and a rare-earth element other than cerium comprises the steps of:

dissolving acid salts of cerium, zirconium and a rare-earth element other than cerium into water for preparing an aqueous solution of the acid salts, the acid salts being selected from the group consisting of nitrate, sulfate and acetate; and spraying and heating the aqueous solution for oxidizing the acid salts so as to convert them into a powder of a composite oxide including cerium, zirconium and a rare-earth element other than cerium.

In the present process for producing the composite oxide powder, an aqueous solution is prepared at the dissolving step. In the aqueous solution, at least one of nitrate, sulfate and acetate of the constituent elements of the composite oxide are dissolved into water in a predetermined ratio. Then, the aqueous solution is sprayed and heated in an oxidative atmosphere so as to evaporate the water contained in the resulting droplets and to oxidize the metallic ions included therein at the spraying and heating step, thereby atomizing the resulting composite oxide.

In the present invention, the term "rare-earth element" means the elements of group 3A in the periodic table of the elements, for example, Sc, Y, lanthanides (e.g., La, Pr, etc.), and actinides (e.g., Ac, Th, etc.), but cerium is excluded therefrom.

As for the starting raw materials for the constituent elements of the composite oxide, at least one salt of the constituent elements can be selected from the group consisting of nitrate, sulfate and acetate. For example, the following salts can be employed: cerium nitrate ($Ce(NO_3)_3 \cdot 6H_2O$), cerium acetate ($Ce(C_2H_3O_2)_3 \cdot H_2O$), zirconyl nitrate ($ZrO(NO_3)_2 \cdot 2H_2O$), zirconyl acetate ($ZrO(C_2H_3O_2)_n$), yttrium nitrate ($Y(NO_3)_3 \cdot 6H_2O$), yttrium acetate ($Y(C_2H_3O_2)_3 \cdot nH_2O$), and nitrates, sulfates and acetates of a rare-earth element other than cerium. Among the nitrates, sulfates and acetates, it is preferred to use the nitrates and/or acetates.

When combining the specific salts to use as the starting raw materials, the following combinations are preferred: a combination of cerium nitrate and zirconyl nitrate, a combination of cerium nitrate, zirconyl nitrate and yttrium nitrate, a combination of cerium acetate and zirconyl acetate, or a combination of cerium acetate, zirconyl acetate and yttrium acetate.

Specifically, zirconium nitrate ($Zr(NO_3)_4 \cdot 5H_2O$) or zirconium acetate ($Zr(C_2H_3O_2)_4$), which is one of general zirconium compounds, can also be used. Moreover, the nitrates, sulfates and acetates can be combined to use, for example, a combination of the nitrates and acetates as earlier mentioned.

The starting raw materials can be prepared by mixing aqueous solutions in a predetermined ratio; namely, into each of the aqueous solutions, each of the constituent elements is dissolved in a predetermined amount, constituent elements which are dissolved thereinto in at least one crystalline form selected from the group consisting of nitrate, sulfate and acetate. Moreover, they can be mixed by preparing an aqueous solution; namely, into a predetermined amount of water, the constituent elements are weighed and dissolved in predetermined concentrations, constituent elements which are dissolved thereinto in at least one crystalline form selected from the group consisting of nitrate, sulfate and acetate.

The resulting mixed aqueous solution can include the constituent elements, which have been dissolved into the mixed aqueous solution in at least one crystalline form selected from the group consisting of nitrate, sulfate and acetate, in a total dissolving amount of from $10^{-3}$ to 10 mole/liter. When the total dissolving amount of the constituent elements, which have been dissolved thereinto in at least one crystalline form selected from the group consisting of nitrate, sulfate and acetate, is less $10^{-3}$ mole/liter, the composite oxide powder is produced inefficiently in a reduced amount. The total dissolving amount of the constituent elements preferably falls in a range of from $10^{-2}$ mole/liter to a solubility limit. When the constituent elements, which are dissolved thereinto in at least one crystalline form selected from the group consisting of nitrate, sulfate and acetate, are involved in the mixed aqueous solution in a large amount, some of them cannot dissolve thereinto. Thus, they are included therein in an amount which falls in their ranges of solubility with respect to water.

The aqueous solution, into which the constituent elements, having been in at least one salt form selected from the group of nitrate, sulfate and acetate, of the composite oxide are dissolved, can be emulsified by adding an inflammable oil and an emulsifying agent. By emulsifying the aqueous solution, the particle diameter of the resulting micro-fine powder can be readily controlled to a certain extent. The oil constituting the emulsion is an inflammable oil. Accordingly, the constituent elements, having been in at least one salt form selected from the group of nitrate, sulfate and acetate, are not only heated by a burner, but also are subjected to extra combustion, because the inflammable oil burns at portions adjacent to the aqueous solution which includes the metallic ions to be oxidized to the composite oxide. As a result, the resulting composite oxide powder can be improved in terms of uniformity in composition. Note that the resulting emulsion can be either a W/O type in which the aqueous solution is dispersed in the oil, or an O/W type in which the oil is dispersed in the aqueous solution.

As for the inflammable oil, it is generally possible to employ an oil, such as kerosine, mineral oil and the like, which is insoluble with water. As for the emulsifying agent, it is usually possible to use a nonionic surface-active agent. In addition to the surface-active agent, it is also possible to utilize a dispersing agent, which can be used as a food additive, as the emulsifying agent.

The emulsion can include the inflammable oil in an amount of from 0.01 to 10 parts by volume, preferably from 0.05 to 1 part by volume, with respect to the volume of the aqueous solution taken as 1 part. Further, the emulsion can include the emulsifying agent in an amount of from 0.01 to 10% by weight, preferably from 0.05 to 5% by weight, with respect to the weight of the aqueous solution taken as 100%. When the inflammable oil and the emulsifying agent are included in the emulsion in these ranges, they can be dispersed evenly to produce an emulsion which is of excellent stability. Note that, however, the further preferable contents of the inflammable oil and emulsifying agent depend on the types and physical properties of the inflammable oil and emulsifying which are actually employed.

When the emulsion includes the inflammable oil in a reduced amount, the combustion area is produced less around the sprayed droplets so that the effects stemming from the inclusion of the inflammable oil are insufficient. When the emulsion includes the inflammable oil in an increased amount, the composite oxide powder is produced inefficiently in a reduced yield, in spite of the large inflammable oil consumption. Thus, such inclusions of the inflammable oil are not preferable.

When the emulsion includes the emulsifying agent; in a reduced amount, the resulting emulsion is of poor stability. When the emulsion includes the emulsifying agent in an increased amount, the resulting emulsion and the resulting composite oxide powder cannot fully enjoy the effects resulting from the inclusion of the emulsifying agent. Thus, such inclusions of the emulsifying agent are not preferable.

The droplets of the emulsion preferably have a size which falls in a range of from 0.1 to 20 micrometers. When the droplets have a size falling in the range, the resulting emulsion is of high stability.

In the spraying and heating step of the present production process, the spraying method is not limited in particular. However, in order to pass the sprayed droplets at a rapid velocity through the combusting area of elevated temperature, it is preferable to employ a spraying method utilizing a dual-fluid nozzle which can produce a fast flow velocity. The sprayed droplets reside in the combustion flame for a time period of from 0.1 to 5 seconds, preferably from 0.2 to 1 second. When the sprayed droplets reside for a prolonged period of time, the resulting composite oxide powder has a reduced specific surface area so that its catalytic capability may deteriorate unpreferably.

The sprayed droplets preferably have a diameter which falls in a range of from 1 to 200 micrometers. When the droplets have an extremely large diameter, a temperature difference arises between the surface and the inside of the droplets and causes the resulting composite oxide to be inhomogenous in terms of composition. The droplets further preferably have a diameter which falls in a range of from 20 to 100 micrometers.

In the spraying and heating step of the present production process, it is preferable to heat the aqueous solution in order that the resulting composite oxide powder have a temperature which substantially falls in a range of from 500° to 1,500° C., further preferably from 500° to 1,000° C. When the aqueous solution is heated to produce the composite oxide powder having a temperature of less than 500° C., the composite oxide is formed insufficiently and the raw material salts may reside therein. When the aqueous solution is heated to produce the composite oxide powder having a temperature of more than 1,500° C., the particles of the resulting composite oxide powder are sintered to aggregate to coarse granules so that the specific surface area of the composite oxide decreases unfavorably.

In order to produce an oxidative atmosphere at the spraying and heating step, air can be blown into the production system, if necessary, oxygen can be introduced thereinto.

The composition of the composite oxide powder can be determined by preparing an aqueous solution into which the salts of the constituent metallic elements are dissolved in predetermined amounts, or by mixing aqueous solutions in a predetermined mixing ratio, aqueous solutions which have been prepared to include the salts of the constituent metallic elements in predetermined amounts in advance. When the composition is expressed by a chemical formula, $Ce_{1-x-y}Zr_xR_yO_{2-z}$ or $Ce_{1-x}Zr_xO_{2-z}$, the composite oxide can be produced whose value x preferably falls in the following range:

$0<x<1$; and whose values x and y further preferably fall in the following ranges:

$0.10 \leq x \leq 0.75$, $0.008 \leq y \leq 0.20$ (more preferably $0.008 \leq y \leq 0.060$), and $0.11 \leq x+y \leq 0.81$.

Note that, in these compositional ranges, z is a positive number of 0.5 or less which depends on oxygen deficiency.

In accordance with the present process, the resulting composite oxide powder has a specific surface area which falls in a range of from 5 to 300 m$^2$/g, preferably from 5 to 100 m$^2$/g, and a crystalline particle diameter which falls in a range of from 4 to 30 nm, preferably from 10 to 30 nm, when measured by X-ray diffraction analysis.

When the composite oxide powder is produced, acids or by-products resulting from the raw materials (e.g., the nitrates, sulfates and acetates) reside in the reaction system. It is preferred to remove the acids or by-products from the reaction system by the following treatments:

when the composite oxide powder is produced by using the nitrates as the raw materials, there arise NO$_x$ gases. The NO$_x$ gases are sucked from the reaction system, and are brought into contact with NH$_3$ or the like to decompose;

when the composite oxide powder is produced by using the sulfates as the raw materials, there arise SO$_x$ gases. The SO$_x$ gases are sucked from the reaction system, and are subjected to an ordinary SO$_x$ treatment to decompose; and when the composite oxide powder is produced by using the acetates as the raw materials, there arise CO and H$_2$O. The CO and H$_2$O are removed from the reaction system, and the CO is cooled to dissolve into H$_2$O to trap.

As mentioned earlier, when the composite oxide having the composition expressed by a chemical formula, $Ce_{1-x-y}Zr_xR_yO_{2-z}$, or $Ce_{1-x}Zr_xO_{2-z}$, is made from raw materials like chlorides, and when Zr substitutes Ce in an amount of from 20% to 80%, there occurs a mixed phase which separates into two phases in the resulting composite oxide. In the present invention, however, the constituent elements being in at least one form selected from the group consisting of nitrate, sulfate and acetate are used as the starting raw materials in order to produce the composite oxide which is of uniform phase. It is still under investigation how this advantage is effected. However, it is assumed that, when the compounds like $Y_2O_3$, which include an element capable of producing stabilized zirconia of fluorite structure, are added, such compounds are likely to form a homogeneous solid solution with $CeO_2$ of fluorite structure.

Except for the water-soluble raw material compounds of Ce and La, the water-soluble raw material compounds of rare-earth elements are expensive. It is possible to carry out the present production process without using such expensive water-soluble raw material compounds. Hence, the present production process is advantageous in terms of production costs.

Further, it is possible to carry out the present process by using a reduced number of raw materials. Therefore, the production steps can be simplified beneficially.

Furthermore, the composite oxide powder, especially one expressed by a chemical formula, $Ce_{1-x}Zr_xO_{2-z}$, has an enhanced oxygen storage capability as high as that of composite oxide powder to which a rare-earth element other than cerium is added. The causes of this advantageous effect are also still under investigation.

In accordance with the present invention, the composite oxide powder having a predetermined composition can be made from cerium, zirconium and rare-earth elements by simply spraying and heating the mixed aqueous solution including the constituent elements having been in at least one form selected from the group consisting of nitrate, sulfate and acetate. Cerium, zirconium and rare-earth elements are known to be less likely to produce composite oxide powder of uniform composition. The causes of this advantageous effect are still under investigation. However, it is assumed that the thermal degrading abilities of the raw materials are appropriately determined, or that the production conditions are favorably adjusted. Concerning the thermal degrading abilities, the raw materials exhibit low vapor pressures and are less likely to produce reductive substances. Regarding the production conditions, the raw materials are rapidly heated to an elevated temperature or reside in the combustion flame for a short period of time.

In accordance with the present process, the composite oxide which is free from the phase separation and has a wide variety of homogeneous compositions can be synthesized by simply spraying the aqueous solution which includes the constituent elements, dissolved in at least one form selected from the group consisting of nitrate, sulfate and acetate, in a predetermined composition. As a result, it is possible to prepare the composite oxide powder with ease, composite oxide powder which satisfies the heat resistance requirement and can effect its catalytic capability maximumly.

In addition, when the aqueous solution to be sprayed is emulsified, its oxidation is facilitated by the combustion of the inflammable oil during heating. As a result, it is possible to form a micro-fine composite oxide powder which is of uniform composition.

Note that, in the resulting composite oxide powder, Zr is dissolved in an increased amount and the inherent substances of the raw materials are prevented from diffusing. Hence, the composite oxide powder can have a large specific surface area even at elevated temperatures.

In particular, yttrium, one of the rare-earth elements, can be added to make the composite oxide powder. When the thus produced composite oxide powder was subjected to an X-ray diffraction analysis, its X-ray diffraction analysis chart had a peak which could shift in proportion to the yttrium dissolving amount, and which was symmetrical. Thus, the composite oxide powder was verified to comprise a uniform solid solution. Likewise, in the X-ray diffraction analysis chart of the composite oxide powder which was free from the rare-earth elements other than cerium (i.e., one expressed by a chemical formula, $Ce_{1-x}Zr_xO_{2-z}$), the peak could shift in proportion to the dissolving amount of zirconium, but showed slightly degraded symmetry. Regardless of the degraded symmetry in the peak, zirconium was verified to dissolve into this composite oxide powder in a sufficient amount that could improve $CeO_2$, one of the ingredients of the exhaust-gas-purifying catalysts, in terms of heat resistance.

As having been described so far, in accordance with the present process, the constituent elements of the composite oxide, being in at least one form selected from the group consisting of nitrate, sulfate and acetate, are mixed to prepare the aqueous solution in which the constituent elements are present in the form of their metallic ions. Then, the aqueous solution is sprayed and heated. Thus, the sprayed droplets themselves are oxidized and atomized, and accordingly the resulting composite oxide powder is micro-fine and uniform on atomic order.

Further, when the emulsified sprayed droplets are heated, it is possible to further stably produce the composite oxide powder which is homogeneous in terms of composition. Furthermore, if such is the case, it is possible to make the composite oxide powder furthermore micro-fine because the time required for heating can be reduced so as not to cause the granular growth of the resulting composite oxide powder.

In addition, as the starting raw materials of the present process, the inorganic salts can be employed which are far less expensive than the simple metallic oxides and the alkoxides. As a result, the present process can reduce the number of the production steps, and can cut down on the production costs of the composite oxide powder greatly.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Aqueous solutions of cerium nitrate, zirconyl nitrate and yttrium nitrate, each having a concentration of 1 mole/liter, were mixed in a ratio of 41:41:8, thereby preparing a mixed aqueous solution. Note that the mixing ratio was expressed as the metallic ion concentration in each of the aqueous solutions.

The mixed aqueous solution was sprayed by using a dual-fluid nozzle at a flow rate of 0.4 liter/hour. Further, a hydrogen burner was disposed so as to form a flame perpendicularly with the spraying direction of the dual-fluid nozzle. The mixed aqueous solution was directly sprayed into the flame, thereby being spray-dried. When heating the mixed aqueous solution, air and oxygen were introduced into the flame at a rate of 1,200 liter/hour and 900 liter/hour, respectively, in order to maintain an oxidative atmosphere in the system. The mixed aqueous solution was combusted at a temperature of 700° C.

The resulting composite oxide powder was subjected to an X-ray diffraction analysis. According to the analysis, the composite oxide powder was verified to have a lattice constant which was intermediate between those of $CeO_2$ and cubic $ZrO_2$, and to be free from phases of impurity.

Second Preferred Embodiment

Aqueous solutions of cerium acetate, zirconium acetate and yttrium nitrate, each having a concentration of 1 mole/ liter, were mixed in a ratio of 41:41:8, thereby preparing a mixed aqueous solution. Note that the mixing ratio was expressed as the metallic ion concentration in each of the aqueous solutions. The mixed aqueous solution was spray-dried in the same manner as described in the "First Preferred Embodiment" section.

Likewise, the resulting composite oxide powder was subjected to an X-ray diffraction analysis. According to the analysis, the composite oxide powder was found to comprise a solid-solution single phase which was intermediate between $CeO_2$ and cubic $ZrO_2$, and no phases of impurity were detected. In addition, the thus synthesized composite oxide powder was subjected to a chemical analysis, and was verified to have a composition which could be expressed in the same elemental ratio as in the fed raw materials.

Third Preferred Embodiment

Aqueous solutions of cerium nitrate, zirconyl nitrate and yttrium nitrate were mixed at two ratios (e.g., 74:18:8 and 18:74:8, expressed as the metallic ion concentration in each of the aqueous solutions), thereby preparing two types of mixed aqueous solutions. Each of the mixed aqueous solutions was spray-dried in the same manner as described in the "First Preferred Embodiment" section.

Likewise, the resulting composite oxide powders were subjected to an X-ray diffraction analysis. According to the analysis, the composite oxide powders were found to comprise a single phase. In addition, the composite oxide powders were subjected to a chemical analysis. As a result, their chemically-analyzed compositions were found to be identical with those of the fed raw materials, respectively.

Fourth Preferred Embodiment

Aqueous solutions of cerium nitrate, zirconyl nitrate and yttrium nitrate, each having a concentration of 3 mole/liter, were mixed at a ratio of 41:41:8, expressed as the metallic ion concentration in each of the aqueous solutions. The other aqueous solutions of cerium nitrate, zirconyl nitrate and yttrium nitrate, each having a concentration of 0.1 mole/liter, were mixed at a ratio of 41:41:8, expressed as the metallic ion concentration in each of the aqueous solutions. Thus, two types of mixed aqueous solutions were prepared which had different compositions each other. Each of the mixed aqueous solutions was spray-dried in the same manner as described in the "First Preferred Embodiment" section.

According to an X-ray diffraction analysis, the resulting two composite oxide powders were found to comprise a single phase. Moreover, composite oxide powders were examined for their specific surface areas by a BET specific surface area measurement. According to the measurement, the composite oxide powders were verified to have a specific surface area of 15 $m^2$/g and 7 $m^2$/g, respectively.

Fifth Preferred Embodiment

A mixed aqueous solution was prepared in the same manner as set forth in the "First Preferred Embodiment" section. Further, 0.8 parts by volume of kerosine (i.e., the inflammable oil), and 0.01 part by volume of solbitane monolaurylate (i.e., the emulsifying agent) were added to 1 part by volume of the mixed aqueous solution. The mixture was stirred by a homogenizer for 5 minutes, thereby preparing an emulsion.

Except that the resulting emulsion was combusted at a temperature of 750° C. by controlling the flow rate of hydrogen in the fuel gas for forming the combustion flame, it was spray-dried in the same manner as described in the "First Preferred Embodiment" section.

According to an X-ray diffraction analysis, the resulting composite oxide powder was found to comprise a single phase. Further, according to a chemical analysis, the composite oxide powder was verified to have a composition which could be expressed in the same elemental ratio as in the fed raw materials. Furthermore, according to a BET specific surface area measurement, the composite oxide powder was found to have a specific surface area of 18 $m^2$/g.

More specifically, according to the chart of the X-ray diffraction analysis, the composite oxide powder, produced by spray-drying the emulsified mixed aqueous solution, exhibited a peak whose symmetry was superior to those of the composite oxide powders, produced out of the aqueous solutions free from the emulsifying. Thus, this composite oxide powder exhibited superb homogeneity in terms of composition. Moreover, a particle diameter of this composite oxide was calculated from the peak in the X-ray diffraction analysis chart, and it was found to be 15 nm.

Sixth Preferred Embodiment

Except that an emulsion was combusted at two temperatures (e.g., 850° C. and 600° C.) by controlling the flow rate of hydrogen supplied to the dual-fluid burner, the Sixth Preferred Embodiment was carried out in the same manner as set forth in the "Fifth Preferred Embodiment" section, thereby producing two composite oxide powders.

According to an X-ray diffraction analysis, the resulting two composite oxide powders were verified to comprise a single phase. According to a BET specific surface area measurement, the composite oxide powders were found to have a specific surface area of 19 $m^2$/g and 11 $m^2$/g, respectively.

Comparative Example

Aqueous solutions of cerium chloride, zirconyl chloride and yttrium chloride were mixed in 3 ratios (e.g., 74:18:8, 41:41:8, 18:74:8, expressed as the metallic ion concentration in each of the aqueous solutions), thereby preparing 3 mixed aqueous solutions. Each of the mixed aqueous solutions was spray-dried in the same manner as described in the "First Preferred Embodiment" section, thereby producing 3 composite oxide powders.

The mixed aqueous solution mixed in a ratio of 74:18:8, expressed as the metallic ion concentration in each of the aqueous chloride solutions, produced a composite oxide powder whose chemically-analyzed composition was identical with those of the fed raw materials. Similarly, the mixed aqueous solution mixed in a ratio of 18:74:8, expressed as the metallic ion concentration in each of the aqueous chloride solutions, produced a composite oxide powder whose chemically-analyzed composition was identical with those of the fed raw materials. According to an X-ray diffraction analysis, these 2 composite oxide powders were verified to comprise a single phase.

On the other hand, the mixed aqueous solution mixed in a ratio of 41:41:8, expressed as the metallic ion concentration in each of the aqueous chloride solutions, produced a composite oxide powder which was found to comprise 2 phases. Note that the mixing ratio was identical with that of the mixed aqueous solution prepared in accordance with the First Preferred Embodiment. Specifically, according to an X-ray diffraction analysis, this composite oxide powder was verified to comprise 2 phases in which a Ce-rich phase and a Zr-rich phase coexisted. Further, according to the X-ray diffraction analysis chart, it was assumed that the Ce-rich phase included Ce in an amount of about 80%, and that the Zr-rich phase included Zr in an amount of about 80%.

Seventh Preferred Embodiment

Aqueous solutions of cerium nitrate, zirconyl nitrate and yttrium nitrate, each having a concentration of 1 mole/liter, were mixed in 5 predetermined ratios so that 5 composite oxide powders could be produced. The 5 composite oxide powders could be expressed by a chemical formula, $Ce_{1-x-y}Zr_xR_yO_{2-z}$, whose x and y proportions were varied as set forth in Table 1 below. Each of the aqueous solutions was spray-dried in the same manner as described in the "First Preferred Embodiment" section, thereby producing 5 composite oxide powders identified with Nos. 1 through 5 in Table 1.

Each of the resulting 5 composite oxide powders was suspended in water. An aqueous solution including Pt in a prescribed concentration was added to each of the suspensions in a predetermined amount. Each of the mixtures was dried to evaporate the water content, thereby loading Pt on each of the composite oxide powders. Thereafter, each of the composite oxide powders was attached to an exhaust system of a 3-liter, 6-cylindered in-line engine, and an endurance test was conducted for 5 hours under the conditions of the air-fuel ratio (A/F)=14.6 and the intake gas temperature=1,000° C. Finally, each of them was subjected to a reductive atmosphere and an oxidative atmosphere alternately at 500° C. to examine its oxygen storage capability. The results of this examination are also summarized in Table 1.

TABLE 1

| Physical Property | Identification | | | | |
|---|---|---|---|---|---|
| | 1 | 2 | 3 | 4 | 5 |
| x | 0.17 | 0.42 | 0.66 | 0.49 | 0.48 |
| y | 0.17 | 0.17 | 0.17 | 0.0015 | 0.08 |
| Specific Surface Area (m²/g) | 17 | 13 | 23 | 21 | 22 |
| Oxygen Storage Capability (micromole/g) | 60 | 66 | 62 | 74 | 71 |

As set forth in Table 1, the composite oxide powders produced in accordance with the Seventh Preferred Embodiment were verified to exhibit a high oxygen storage capability of 60 micromole/g or more at 500° C.

For comparison purpose, $CeO_2$, $ZrO_2$ and $Y_2O_3$ powders were mixed in a mixing ratio so as to produce a mixture which had the same composition as that of the composite oxide powder identified with No. 2. The mixture was processed in the same manner as those of the composite oxide powders identified with Nos. 1 through 5. Then, this comparative example was found to exhibit an oxygen storage capability of 45 micromole/g at 500° C.

Eighth Preferred Embodiment

Aqueous solutions of cerium nitrate and zirconyl nitrate, each having a concentration of 1 mole/liter, were mixed in a ratio of 1:1, thereby preparing a mixed aqueous solution. Note that the mixing ratio was expressed as the metallic ion concentration in each of the aqueous solutions. Then, the mixed aqueous solution was emulsified, spray-dried in the same manner as described in the "Fifth Preferred Embodiment" section. Thus, a composite oxide powder was produced which had a composition expressed by a chemical formula, $Ce_{0.5}Zr_{0.5}O_2$.

The resulting composite oxide powder was examined for its physical properties as set forth in the "Seventh Preferred Embodiment" section. This composite oxide powder was verified to have a specific surface area of 14 m²/g and to exhibit a very high oxygen storage capability of 160 micromole/g at 500° C. Thus, it was found to possess a superb oxygen storage capability.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a powder of a composite oxide including cerium, zirconium and a rare-earth element other than cerium, comprising the steps of:

dissolving salts of cerium, zirconium and a rare-earth element other than cerium into water to prepare an aqueous solution of said salts, wherein said salts are selected from the group consisting of nitrate, sulfate and acetate, and further adding an inflammable oil and an emulsifying agent to said aqueous solution to prepare an emulsion of said aqueous solution; and spraying and heating said emulsion, thereby producing a powder of a composite oxide including cerium, zirconium and a rare-earth element other than cerium, wherein said heating is at 500° to 1500° C.

2. The process according to claim 1, wherein, in said adding step, said emulsion is prepared to include said inflammable oil in an amount of from 0.01 to 10 parts by volume with respect to the volume of said aqueous solution taken as 1 part.

3. The process according to claim 2, wherein, in said adding step, said emulsion is prepared to include said inflammable oil in an amount of from 0.05 to 1 part by volume with respect to the volume of said aqueous solution taken as 1 part.

4. The process according to claim 1, wherein, in said adding step, said emulsion is prepared to include said emulsifying agent in an amount of from 0.01 to 10% by weight with respect to the weight of said aqueous solution taken as 100%.

5. The process according to claim 4, wherein, in said adding step, said emulsion is prepared to include said emulsifying agent in an amount of from 0.05 to 5% by weight with respect to the weight of said aqueous solution taken as 100%.

6. The process according to claim 1, wherein, in said spraying and heating step, said emulsion is sprayed to droplets having a size of from 1 to 200 micrometers.

7. The process according to claim 1, wherein, in said dissolving step, said salts are dissolved into water in the concentration range of from $10^{-3}$ to 10 mole/liter.

8. The process according to claim 7, wherein, in said dissolving step, said salts are dissolved into water in the concentration range of from $10^{-2}$ mole/liter to a solubility limit.

9. The process according to claim 1, wherein, in said spraying and heating step, said aqueous solution is burned for a time period of from 0.1 to 5 seconds.

10. The process according to claim 1, wherein said nitrate in said dissolving step is selected from the group consisting of cerium nitrate ($Ce(NO_3)_3 \cdot 6H_2O$), zirconyl nitrate ($ZrO(NO_3)_2 \cdot 2H_2O$), yttrium nitrate ($Y(NO_3)_3 \cdot 6H_2O$) and zirconium nitrate ($Zr(NO_3)_4 \cdot 5H_2O$).

11. The process according to claim 1, wherein said acetate in said dissolving step is selected from the group consisting of cerium acetate ($Ce(C_2H_3O_2)_3 \cdot H_2O$), zirconyl acetate ($ZrO(C_2H_3O_2)n$), yttrium acetate ($Y(C_2H_3O_2)_3 \cdot nH_2O$) and zirconium acetate ($Zr(C_2H_3O_2)_4$).

12. The process according to claim 1, wherein said salts in said dissolving step are cerium nitrate, zirconyl nitrate and yttrium nitrate, or cerium acetate, zirconyl acetate and yttrium acetate.

13. A process for producing a powder of a composite oxide of cerium, zirconium and a rare-earth element other than cerium, comprising:

spraying and heating an emulsion of salts, water, an inflammable oil and an emulsifying agent, thereby producing a powder of a composite oxide comprising cerium, zirconium and a rare-earth element other than cerium, wherein said salts comprise a cerium salt, a zirconium salt and a salt of a rare-earth element other than cerium, said cerium salt is selected from the group consisting of a nitrate, a sulfate and an acetate, said zirconium salt is selected from the group consisting of a nitrate, a sulfate and an acetate, said salt of a rare-earth element other than cerium is selected from the group consisting of a nitrate, a sulfate and an acetate, and said heating is at 500° to 1500° C.

* * * * *